(12) United States Patent
Sarkar et al.

(10) Patent No.: US 8,585,902 B2
(45) Date of Patent: Nov. 19, 2013

(54) PROCESS FOR RECOVERING PRODUCTS FROM FERMENTATION

(75) Inventors: Manoj Kumar Sarkar, Hyedrabad (IN);
Banibrata Pandey, Hyedrabad (IN);
Venkata Sunil Jagani, Hyedrabad (IN);
Venkata Prasad Kutikuppala,
Hyedrabad (IN)

(73) Assignee: Nagarjuna Energy Private Limited,
Nagarjuna Hills Punjagutta, Hyderabad
(IN)

( * ) Notice: Subject to any disclaimer, the term of this patent is extended or adjusted under 35 U.S.C. 154(b) by 705 days.

(21) Appl. No.: 12/665,927

(22) PCT Filed: Jun. 19, 2008

(86) PCT No.: PCT/IB2008/001613
§ 371 (c)(1),
(2), (4) Date: May 17, 2010

(87) PCT Pub. No.: WO2008/155643
PCT Pub. Date: Dec. 24, 2008

(65) Prior Publication Data
US 2010/0243566 A1    Sep. 30, 2010

(30) Foreign Application Priority Data

Jun. 20, 2007  (IN) ............................ 2380/CHE/2006

(51) Int. Cl.
*B01D 11/02* (2006.01)
*B01D 11/04* (2006.01)

(52) U.S. Cl.
USPC ................ 210/634; 95/42; 95/149; 159/47.1;
210/632; 210/633; 210/774; 422/256; 435/183

(58) Field of Classification Search
USPC ................. 210/175, 511, 634, 774, 632, 633;
159/47.1; 422/256; 435/183
See application file for complete search history.

(56) References Cited

U.S. PATENT DOCUMENTS

| | | | | |
|---|---|---|---|---|
| 1,826,349 A | * | 10/1931 | Harding et al. | 554/177 |
| 2,200,390 A | * | 5/1940 | Freeman | 554/13 |
| 2,200,391 A | * | 5/1940 | Freeman | 554/14 |
| 2,281,865 A | * | 5/1942 | Van Dijck | 208/319 |
| 2,320,738 A | * | 6/1943 | Jenkins | 554/207 |
| 4,251,231 A | * | 2/1981 | Baird | 44/452 |
| 4,770,760 A | * | 9/1988 | Noda et al. | 204/425 |
| 4,877,530 A | * | 10/1989 | Moses | 210/511 |
| 4,954,260 A | * | 9/1990 | Ludmer et al. | 210/634 |
| 4,962,275 A | * | 10/1990 | Bruno | 585/834 |
| 5,405,533 A | * | 4/1995 | Hazlebeck et al. | 210/634 |
| 5,628,906 A | * | 5/1997 | Shinnar et al. | 210/634 |
| 6,106,720 A | * | 8/2000 | Kanel et al. | 210/634 |
| 6,485,613 B1 | * | 11/2002 | Goorden | 202/158 |
| 6,589,422 B2 | * | 7/2003 | Low | 210/259 |

(Continued)

FOREIGN PATENT DOCUMENTS

| | | |
|---|---|---|
| GB | 1027632 | 4/1966 |
| JP | 2006136780 | 1/2006 |
| NL | 7210013 | 1/1974 |

*Primary Examiner* — Joseph Drodge
(74) *Attorney, Agent, or Firm* — Shaukat A. Karjeker; Colin P. Cahoon; Carstens & Cahoon, LLP

(57) ABSTRACT

The present invention provides a process and an apparatus for transferring a solute from a first fluid to a second fluid immiscible in each other.

4 Claims, 2 Drawing Sheets

(56) References Cited

U.S. PATENT DOCUMENTS 7,803,968 B2 * 9/2010 Bonnet et al. ............... 562/543
8,048,304 B2 * 11/2011 Waibel et al. ............... 210/634
2003/0086894 A1 * 5/2003 Hensen et al. ............. 424/70.15
2005/0051917 A1 * 3/2005 Grothe et al. .................. 264/5
2006/0124544 A1 * 6/2006 Wills ........................... 210/634

* cited by examiner

US 8,585,902 B2

PROCESS FOR RECOVERING PRODUCTS FROM FERMENTATION

FIELD OF INVENTION

The present invention is in the field of mass transfer operation in multiphase system.

BACKGROUND OF THE INVENTION

In a multiphase chemical reaction where immiscible liquid reactants are involved, the dispersion of one of the liquids is converted into fine droplets to enhance the surface area to increase the reaction rate. In order to achieve the same physical dispersion is commonly used. However, this process requires enormous energy and capital cost.

Multiphase chemical reaction is involved in many areas such as chemical reaction, solvent extraction and ultrafine particulate separation from gas stream by liquid droplets.

Such problem can be further exemplified by citing downstream processing of a microbial fermentation processes. The various processes used for the actual recovery of useful products from fermentation or any other industrial process are called downstream processing. The cost of downstream processing (DSP) is often more than 50% of the manufacturing cost, and there is product loss at each step of DSP. In addition, the product is either present in the cells or in the medium or both.

Liquid-liquid extraction is one of the widely used processes for recovering fermentation product. In liquid-liquid extraction process, one of the liquid (normally the substrate) is in continuous phase filling the whole extraction column and flowing in one direction. The second liquid (normally the solvent) is in finely dispersed phase and flowing in the opposite direction. A fine dispersion is required to make the higher surface area available for the purpose of efficient mass transfer from one phase to the other and which is a challenge today. Only available process to increase surface area of disperse phase is physical dispersion, especially by atomization. Atomization involves capital cost of expensive atomizer and external pressure increases running cost of the process, thereby rendering the process energy intensive and costly.

In general liquid-liquid extraction, a solvent will be atomized to generate small droplets of solvent for creating more surface area and for atomization through atomizer more energy required, which may not industrially feasible for high volume low value products.

Applicant has made an effort to increase the surface area of one of liquid droplet of dispersion liquid to make liquid-liquid extraction process more energy efficient. Ongoing preliminary experiments indicates that the method can be efficiently used in separating ultrafine particles from gaseous phase by dispersion ultrafine liquid droplets by condensing a vapor in a system without involving extensive energy.

OBJECTS OF THE PRESENT INVENTION

The main object of the present invention is to increase the surface area of liquid droplet of dispersing liquid phase to improve mass transfer operation in multiphase system. Another object of the present invention is to provide a process and apparatus for transferring solute from first fluid to second fluid.

DETAILED DESCRIPTION OF THE INVENTION

Figure 1:
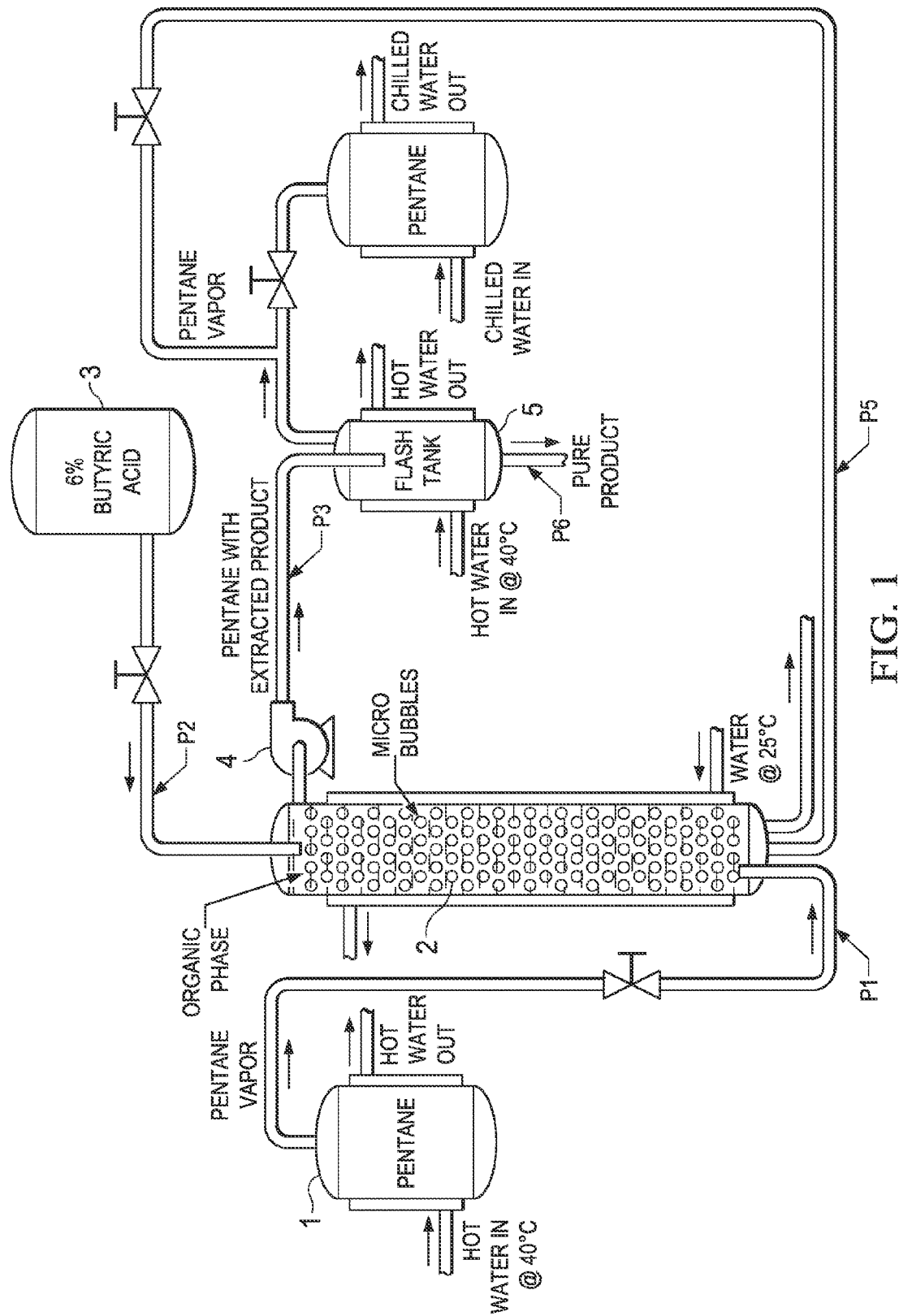
FIG. 1 illustrates an apparatus for butyric acid extraction according to the present invention.

Accordingly, the present invention provides a process of transferring solute from first fluid to second fluid immiscible in each other, said process comprising the steps of introducing second liquid in a gaseous state into the first liquid, wherein the first fluid is maintained at a temperature lower than condensation temperature of the second fluid whereby the condensation of the first fluid forms ultra-fine liquid particles which extracts the solute from the second fluid.

Accordingly, the present invention discloses a process that obviates the drawback as stated above by changing the phase of dispersion liquid from vapor to liquid.

In an aspect of the present invention, the solute is soluble in first fluid and second fluid, when both the fluids are in contact with each other.

In another aspect of the present invention, the solute is in the form of liquid, solid or gas.

In yet another aspect of the present invention the first fluid and second fluid are in countercurrent flow.

The present invention also provides an apparatus for transferring a solute from first fluid to second fluid immiscible in each other comprising:
an extraction chamber maintained at a first temperature having a first inlet for supplying the first fluid; said extraction chamber comprises a second inlet for supplying the second fluid in the extraction chamber; said second inlet is coupled to a reservoir suitable for storing second fluid maintained at a second temperature; wherein said first temperature is lower than the condensation temperature of the second fluid and said second temperature is higher than the condensation temperature of the second fluid;
a flash tank coupled to a first outlet provided on the extraction chamber for receiving the solution of second fluid and the solute; wherein the flash tank is maintained at a third temperature is which higher than the condensation temperature of the second fluid.

In an aspect of the present invention the first inlet and the second inlet is place so that the first fluid and the second fluid supplied in the extraction chamber in counter-current direction.

In another aspect of the present invention, the extraction chamber provided with a jacket for supplying water at a predetermined temperature.

In still another aspect of the present invention, the reservoir provided with a jacket for supplying water at a predetermined temperature.

In yet another aspect of the present invention the flash tank provided with a jacket for supplying water at a predetermined temperature.

The process of increasing surface area is exemplified by liquid-liquid extraction during downstream fermentation process, wherein the surface area of droplet of dispersing liquid is increased by change of the liquid phase of dispersing liquid from initial gaseous state to liquid state.

In one of the advantageous aspect of the present process, the dispersion liquid is selected from low boiling point solvents such as n-pentane (36.1° C.), R143a (1,1,1,2-tetrafluoroethane, (−26.3° C.)), Hexane (69.1° C.), Chloroform (61.2° C.) so that removal of solvent requires no additional energy. The solvent separated by flash evaporation by increasing little temperature or by decreasing pressure thereby forming its vapor in the flash evaporator and continuously passed through the extraction column to make the process continuous.

In the present invention, solvent is entering into extraction column or chamber in the form of vapor and by condensing the solvent vapors in the extraction column, the small droplets with large surface area formed.

Also, the present invention provides an apparatus for transferring a solute from first fluid to second fluid immiscible to each other. The first fluid is a solution of the solute to be extracted, and the second fluid is a fluid in which solute is to be extracted. The apparatus of the present invention comprises an extraction chamber. Said extraction chamber can be in the form of a column. The extraction chamber has a first inlet and a second inlet, for supplying the first fluid and the second fluid respectively. In an embodiment of the present invention the first inlet and the second inlet is located on the extraction chamber in such a way that first fluid and second fluid travel in the extraction chamber in counter-current direction. The extraction chamber maintained at a first temperature, which is lower than the condensation temperature of the second fluid. A reservoir, which is suitable for containing second liquid, coupled to the second inlet of the extraction chamber. The reservoir is maintained at a second temperature which is higher than the condensation temperature of the second fluid. In other words, the reservoir contains the second fluid in vapor or gaseous form. The second liquid in the vapor or gaseous form supplied in the extraction chamber through the second inlet. The vapors of the second fluid entering the extraction chamber condense and form ultra-fine particles of liquids, which extract the solute from the first liquid. Since the two fluids i.e. first fluid and second fluid are immiscible in each other they form separate layers in the extraction chamber. A first outlet can be provided in the extraction chamber for collecting the solution of second fluid and the solute. Also, a second outlet can be provided in the extraction chamber for collecting the first fluid. The solution of the solute in the second fluid collected from the extraction chamber supplied to a flash tank. The flash tank can be coupled to the first outlet of the extraction chamber. The flash tank is maintained at a third temperature that is higher than the condensation temperature of the second fluid. Supplying the solution of solute in second fluid in the flash tank causes removal of the second fluid and thereby leaving behind the solute. The solute can then be extracted from the flash tank.

A second outlet can be provided on the extraction chamber for collecting the first fluid from the extraction chamber.

In an embodiment of the present invention, a jacket can be provided on the extraction chamber through which water at a first temperature can be supplied for maintaining the extraction chamber at the first temperature. Similarly, a jacket can be provided on the reservoir through which water at a second temperature is supplied for maintaining the reservoir at second temperature. Likewise, a jacket can be provided on the flash tank through which water at a third temperature can be supplied to maintain the flash tank at the third temperature.

The temperature can be selected on the basis of the nature of the fluids.

EXAMPLES

The following examples are given by way of illustrations of the present invention and should not be considered to limit the scope of present invention.

Example 1

Butyric acid of concentration 6% (w/v) used as feed solution and passed through 1 meter long extraction column continuously at the flow rate of 210 ml/min. The column content is maintained at sub ambient temperature 25° C. 1 liter n-Pentane passed through flooding column of aqueous solution and observed the concentration change of spent liquid, which were collected at bottom of column for every 10 minutes. Concentration of remaining product in flash tank also determined. The observations are given in table-1. The sample analysis is done with gas chromatography.

TABLE 1

| Time in minutes | Concentration of butyric acid raffinate stream (% w/v) |
| --- | --- |
| 60 | 3.1 |

Example 2

Maintaining the same reactant and similar experimental conditions of Example 1, similar liquid-liquid extraction was carried out by using the process of present invention. Instead of dispersing liquid phase directly in the column as done in Control experiment (Example 1), the same was administered in the column in its gaseous state and subsequently condensed the gaseous phase into liquid thereby forming ultra-fine particles of dispersion liquid. Dispersing liquid i.e. 1 liter n-Pentane is taken in tank and vaporized by using 40° C. hot water in jacket. The vapors are passed through flooding column of aqueous solution wherein the column temperature is 25° C., which condenses the vapor into liquid state. The liquid droplets traveled downwards due to its higher density and extracted solutes from the solution. Concentration of remaining product in flash tank also determined. Concentration of remaining product in flash tank also determined. The observations given in Table-2. The sample analysis is done with gas chromatography. Upon comparing Examples 1 and 2, it is observed that where surface area of liquid droplets of dispersing liquid phase was increased, the extraction was extremely efficient. Especially, in control experiment 50% recovery was attained on $60^{th}$ minutes and the effect was at within attained within 20 minutes.

TABLE 2

Concentration change of raffinate stream with time

| Sl. No. | Time (min) | Concentration butyric acid of raffinate stream (% w/v) |
| --- | --- | --- |
| 1 | 10 | 4.07 |
| 2 | 20 | 3.08 |
| 3 | 30 | 2.69 |
| 4 | 40 | 1.42 |
| 5 | 50 | 0.89 |
| 6 | 60 | 0.57 |

1 Concentration of feed butyric acid solution : 6 % ( w/v)
2 Concentration of product recovered : 100 % ( w/v)

Example 3

Ethanol of concentration 8% (w/v) used as feed solution in 1 meter long extraction column. Solvent used was 1,1,1,2- tetrafluoroethane, which was introduced in the column in a vapor form and the column content is maintained at sub ambient temperature 15° C. The vapor, under low temperature condenses into liquid state. The liquid droplets traveled downwards due to its higher density and extracted solutes' from the solution. Concentration of remaining product in flash tank also determined. In the observations given in Table-3 50% recovery was attained on 10 minutes.

TABLE 3

Concentration change of raffinate stream with time

| Sl. No. | Time (min) | Concentration of ethanol in raffinate stream (% w/v) |
|---|---|---|
| 1 | 10 | 4.2 |
| 2 | 20 | 2.69 |
| 3 | 30 | 1.53 |
| 4 | 40 | 0.92 |
| 5 | 50 | 0.64 |
| 6 | 60 | 0.53 |

1 Concentration of feed ethanol solution: 8% (w/v)
2 Concentration of product recovered: 100% (w/v)

Example 4

The same trend was observed when 2% butanol was used as feed material and 1, 1, 1, 2-tetrafluoroethane as dispersing liquid phase. 50% recovery was observed within 5 minutes.

TABLE 4

Concentration change of raffinate stream with time

| S. No | Time (min) | Concentration of Butanol in raffinate stream (% w/v) |
|---|---|---|
| 1 | 10 | 0.51 |
| 2 | 20 | 0.23 |
| 3 | 30 | 0.17 |
| 4 | 40 | 0.13 |
| 5 | 50 | 0.09 |
| 6 | 60 | 0.05 |

1 Concentration of feed Butanol solution: 2%(w/v)
2 Concentration of product recovered: 100%(w/v)

Example 5

As shown in FIG. 1 pentane vapors generated in initial solvent storage tank (1). The pentane vapors are generated by passing hot water between 40° to 60° C. through jacket provided on the extraction column. Pentane vapors generated in the storage tank (1) are sent to the extraction column (2) through solvent inlet pipe (P1) from the bottom of the extraction column (1). Aqueous butyric acid solution is stored in a solution storage tank (3). Aqueous butyric acid solution is continuously passed to extraction column (2) by gravity through solution inlet pipe (P2) from top of the extraction column (2). The temperature of the column (2) content is maintained at sub ambient by using water at 25° C. As pentane vapors enter into the column it condense and form micro droplets which gives more surface area for mass transfer. The phase change and formation of micro bubbles is important phenomenon of the present invention. n-pentane extracts the butyric acid and as the n-pentane is lighter than water it goes up and forms organic layer at the top of the extraction column. The organic layer which contains pentane and butyric acid is continuously removed from extraction column (2) through pipe line (P3), by using a pump (4). The spent liquid will be removed from bottom through raffinate line (P4), which contains small trace of butyric acid. As this operation continues after some time process comes to steady state. The extract of n-pentane and butyric acid collected from the extraction container (2) sent to flash tank (5) through extract through line (P3). To flash tank (5) heat energy is given by using hot water at a temperature of 40° C. through jacket then the n-pentane vapors flashes and the same vapor will be recycled to extraction column through stream (P5). At the end of the operation, vapors can be collected and condensed in a condensation tank (6) by using chilled water through jacket. The pure butyric acid collected from flash tank (5) through product outlet stream (P6).

Figure 2:
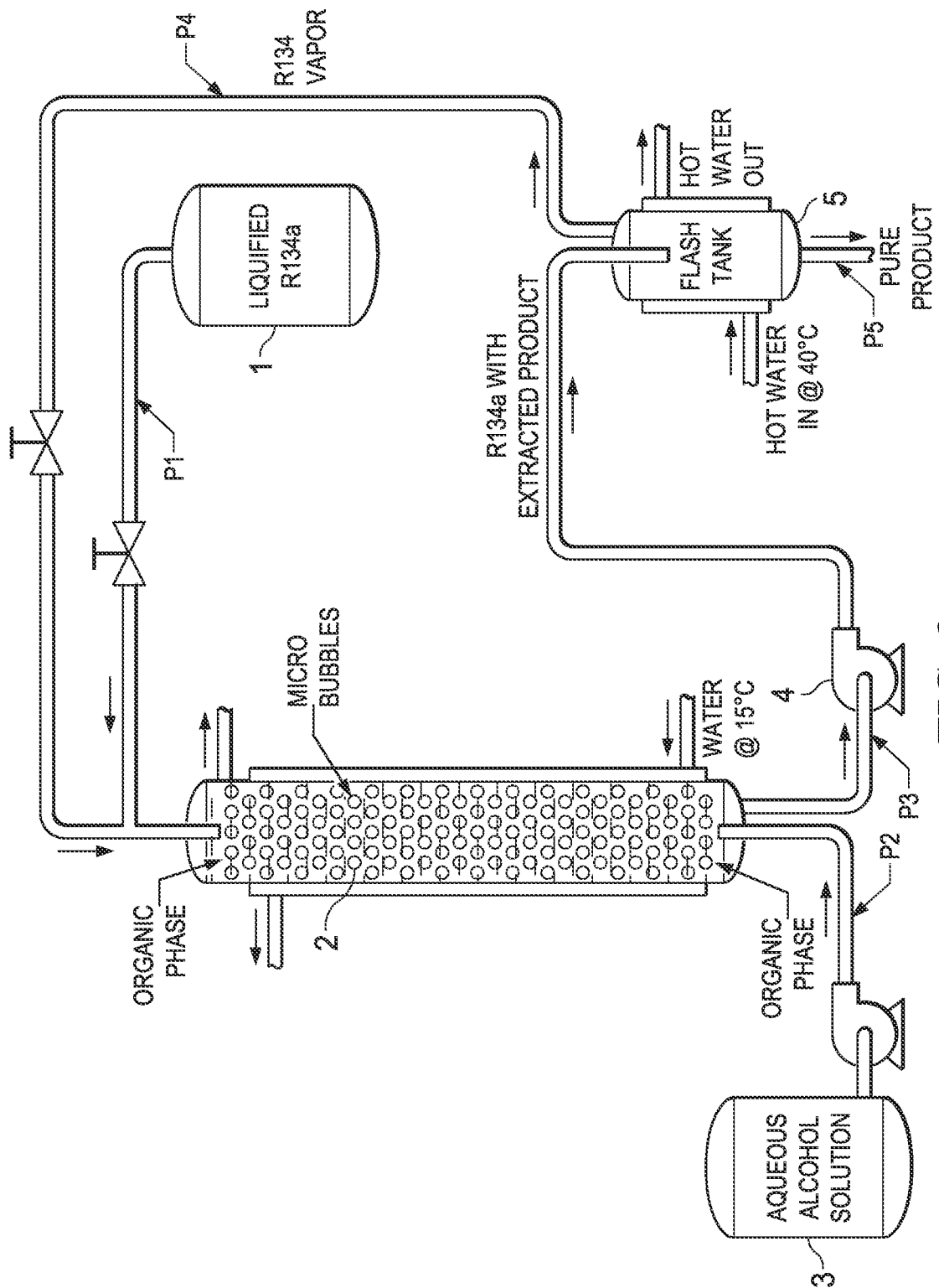
FIG. 2 illustrates an apparatus for alcohol extraction according to the present invention.

As shown in FIG. 2, R134a gas is stored in a storage tank (1) at pressure of 8-bar pressure in the liquefied form. R134 sent to the extraction column (2) from top side through solvent inlet pipe (P1) from storage tank (1). Aqueous alcohol (Ethanol/Butanol) solution is stored in a storage tank (3) continuously pumped to extraction column (2) through solution inlet pipe (P2), from solution storage tank (3). The temperature of the extraction column (2) is maintained at sub ambient by using water at 15° C. As R134a enters in to the column (2), it condenses and forms micro droplets which give more surface area for mass transfer. The phase change and formation of micro bubbles is important phenomenon of the present invention. R134a extracts the alcohol (Ethanol/Butanol) and as R134a is heavier than water it goes down and forms organic layer at the bottom. The organic layer which contains R134a and alcohol (Ethanol/Butanol) is continuously removed from the extraction column (2) through line (P3) by using a pump (4). The spent alcohol (Ethanol/Butanol) will be removed from top, which contains very less concentration of alcohol (Ethanol/Butanol). As this operation continues after some time, process comes to steady state. The extract of R134a and alcohol (Ethanol/Butanol) is sent to a flash tank (5) through extract stream (P3). Heat energy to the flash tank (5) is given by hot water at a temperature of 40° C. through jacket then R134a vapors flashes and the same vapor will be recycled to extraction column (2) through stream (P4). The pure alcohol is collected from flash tank (5) through product outlet stream (P5)). This experiment has to be conducted at a pressure of 8 bar.

We claim:

1. A process of transferring solute from first fluid to second fluid immiscible in each other, said process comprising the steps of introducing second fluid in a gaseous state into the first liquid, wherein the first fluid is maintained at a temperature lower than condensation temperature of the second fluid whereby the condensation of the first fluid forms ultra-fine liquid particles which extracts the solute from the second fluid;
   wherein the process is carried out in an apparatus comprising a jacketed extraction chamber that has a separate inlet for each of the respective first and second fluids, and an outlet coupled to a flash tank.

2. A process as claimed in claim 1, wherein the solute is soluble in first fluid and second fluid, when both the fluid are in contact with each other.

3. A process as claimed in claim 1, wherein the solute is in the form of liquid, solid or gas.

4. A process as claimed in claim 1, wherein the first fluid and second fluid are in counter-current flow.

* * * * *